(12) United States Patent
Biester et al.

(10) Patent No.: US 6,899,171 B2
(45) Date of Patent: May 31, 2005

(54) ACTUATING DEVICE (75) Inventors: Klaus Biester, Wienhausen (DE); Norbert Lenz, Celle (DE)

(73) Assignee: Cooper Cameron Corporation, Houston, TX (US)

( * ) Notice: Subject to any disclaimer, the term of this patent is extended or adjusted under 35 U.S.C. 154(b) by 0 days.

(21) Appl. No.: 10/276,204

(22) PCT Filed: May 7, 2001

(86) PCT No.: PCT/EP01/05156
§ 371 (c)(1),
(2), (4) Date: Nov. 12, 2002

(87) PCT Pub. No.: WO01/86370
PCT Pub. Date: Nov. 15, 2001

(65) Prior Publication Data
US 2003/0150606 A1 Aug. 14, 2003

(30) Foreign Application Priority Data
May 11, 2000 (DE) ..................... 200 08 415 U (51) Int. Cl.$^7$ ..................... E21B 23/00; F16K 31/04
(52) U.S. Cl. ............... 166/66.7; 74/89.38; 74/89.37; 251/129.12; 251/251
(58) Field of Search ............... 166/66.6, 66.7; 251/129.01, 129.11, 129.12, 251, 213; 74/89.23, 89.32, 89.33, 89.37, 89.38

(56) References Cited
U.S. PATENT DOCUMENTS 5,195,721 A  3/1993 Akkerman ............... 251/129
5,983,743 A * 11/1999 McGregor et al. ......... 74/89.23
6,446,519 B1 * 9/2002 Biester ..................... 74/89.16

FOREIGN PATENT DOCUMENTS

| EP | 0 384 607 | 8/1990 | ......... F16K/31/143 |
| EP | 1 024 422 | 8/2000 | .......... G05G/15/00 |
| GB | 2 266 942 | 11/1993 | ........... F16K/31/10 |
| WO | WO 98/30816 | 7/1998 | ........... F16H/25/20 |

* cited by examiner

Primary Examiner—Kenn Thompson
(74) Attorney, Agent, or Firm—Conley Rose, P.C.

(57) ABSTRACT

An actuator system for shifting a control device that is pressure-loaded in the direction opposite the shift direction. The actuator system comprises an actuator element capable of being axially moved in the shift direction within a system enclosure by a rotating spindle of an advance mechanism. The rotating spindle is connected to a rotating sleeve that is pivot-mounted in the system enclosure and surrounds the rotating spindle. The rotating sleeve is locked in position in the direction opposite the direction of advance rotation of the rotating spindle by a volute spring. The volute spring is associated with an emergency release unit for resetting the actuator element against the shift direction. The emergency release unit comprises a tensioning sleeve for the volute spring. The tensioning sleeve rotates between a tensioned and a relaxed position and is pressure-loaded in the direction of its relaxed position. The volute spring is releasably retained in the tensioning sleeve's tensioned position.

32 Claims, 5 Drawing Sheets

ACTUATING DEVICE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

This invention relates to an actuator system for shifting a control device that is pressure-loaded in the direction opposite the shift direction, said actuator system incorporating an actuator element capable of being axially moved in the shift direction within a system enclosure by a rotating spindle of an advance mechanism, which rotating spindle is slidingly connected to a rotating sleeve that is pivot-mounted in the system enclosure and surrounds the rotating spindle which latter, relative to a circular flange rigidly connected to the system enclosure, is locked in position in the direction opposite the direction of advance rotation of the rotating spindle by means of a volute spring which volute spring is associated with an emergency release unit for resetting the actuator element against the shift direction.

An actuator system of this type has been known in prior art, serving to actuate control devices such as valves, pressure regulators and other control mechanisms but employed most particularly in submarine oil and gas exploration and production equipment. Evidently, the actuator system can be employed equally well in comparable land-based, difficult-to-access or remote locales.

SUMMARY OF THE EMBODIMENTS

When the switching device is shifted against the direction of the pressure load, the actuator element is moved axially so that in its extended position it serves to shift the control device into the operational ready-state. When the actuator element is retracted away from the shift direction, the control device is deactivated. An actuator system of this type is provided with a suitable system enclosure protecting it from the elements in a marine or land-based environment. The actuator element is shifted by the rotation of a rotating spindle which is slidingly connected to a rotating sleeve surrounding it. In the direction opposite the direction of advance rotation, a volute spring locks this rotating sleeve in position relative to a circular flange rigidly attached to the system enclosure. This ensures that, while a rotation of the rotary spindle in the advance direction for extending the actuator element is possible without being impeded by the volute spring, any automatic insertion of the actuator element into the system enclosure by the pressure load in the control device against the shift direction is prevented by the volute spring. Thus, for example, any pressure on the advance mechanism is neutralized and absorbed by the system enclosure.

However, in order to permit an automatic resetting of the actuator element for closing the control device in the event of a power failure or other problem, the volute spring connects to an emergency release unit which releases the volute spring to a point where the rotating sleeve can be turned relative to the circular flange, allowing the rotating spindle that is slidingly connected to the rotating sleeve to turn against the direction of advance rotation and thus moving the actuator element against the shift direction.

In the prior-art actuator system, the emergency-release unit is mounted on the outside of the system enclosure and is constituted of an electromagnet with a plunger protruding into the system enclosure. The plunger is located away from the end of the volute spring which thus rigidly connects the rotating sleeve and the circular flange. In the event of a power failure a spring strikes the plunger, moving it against the end of the volute spring which allows the latter to be released. The overall design of that actuator system is relatively complex while at the same time it is difficult if not impossible to adjust the tension of the volute spring seated on the rotating sleeve and circular flange.

It is therefore the objective of this invention to improve the design of an actuator system of the aforementioned type so as to offer a more compact and simpler configuration while at the same time permitting simple and precise adjustment of the volute spring in terms of a torsionally stable connection of the rotating sleeve and the circular flange.

This is accomplished, in the context of the characteristic conceptual features per claim 1, by providing the emergency release unit with a tensioning sleeve for the volute spring, rotatable between a tensioned position and a relaxed position, pressure-loaded in the direction of the relaxed position and releasably held in the tensioned position.

In the tension sleeve's relaxed position the volute spring is released to a point where the volute spring permits a rotation of the rotating sleeve relative to the circular flange and thus a rotation of the rotating spindle in the direction opposite the direction of advance rotation. When the tensioning sleeve is turned out of its relaxed position, the coiling strength of the volute spring can prevent any turning of the rotating sleeve relative to the circular flange. Besides, the tensioning sleeve is usually contained inside the system enclosure so that no part of the emergency release unit protrudes from the system enclosure. The emergency release unit is thus far less susceptible to damage or similar problems.

For moving the rotating spindle in the direction of advance rotation, the advance mechanism can be equipped with an electric motor, for instance a direct-current servomotor.

It is possible to connect the motor and the rotating spindle in a direct-drive configuration. For an advance mechanism with a high torque transfer the rotating spindle may be a revolving ball screw and the connection of the electric drive motor may be by way of a ball nut holding the revolving ball screw.

A drive assembly may be installed between the electric motor and the ball nut for converting the rotational speed of the electric motor into a corresponding number of revolutions of the rotating spindle. Such a drive unit may be in the form of a standard clutch-and-brake combination or alternatively a so-called flex-spline drive without the traditional gears.

For a better suspension of the rotating spindle and/or the ball nut the annular disk can be provided with a ring extension on the side facing the ball nut, with a connecting sleeve pivot-mounted on the ring extension. One end of the connecting sleeve is attached, particularly to removable fashion, to the motor-drive unit, the other end to the ball nut. The rotating spindle revolves in the connecting sleeve either as a rotatably supported insert or independently pivot-mounted. The motor-drive unit turns the connecting sleeve and the rotation is transferred to the ball nut, causing the rotating spindle to turn in the direction of advance rotation as related to the ball nut, or in the opposite direction.

To permit a rotation of the connecting sleeve only in the advance direction of the rotating spindle while at the same time causing the overall system enclosure to absorb any corresponding counterpressure exerted on the rotating spindle, an additional volute spring can be positioned between the connecting sleeve and the ring extension.

As a simple way to determine the position of the actuator element and the corresponding position of the rotating spindle, the advance mechanism and more specifically the electric motor can be equipped with a positional sensor. The sensor would detect for instance the respective longitudinal position of the rotating spindle from which it determines the position of the actuator element. It is also possible to track the advance path of the actuator element directly by means of an appropriate positional sensor in the motor. This applies in analogous fashion to the reverse rotation of the rotating spindle and thus to the resetting of the actuator element.

For protecting the additional volute spring against external factors and/or for positioning the connecting sleeve and ball nut especially in a radially and axially suspended direction, a casing may be provided to enclose the ring extension and the connecting sleeve, the casing to be removably attached to the annular disk. By virtue of being attached to the annular disk the casing is rigidly connected to the system enclosure.

To ensure proper guidance of the rotating spindle in the area between the ball nut and the actuator element, the rotating sleeve may extend essentially from the ball nut all the way to the exit end of the system enclosure opposite the electric motor, while the rotating sleeve is provided with at least two guide slots in which appropriate guide lugs, protruding radially in relation to the rotating spindle, can be moved in an axial direction. Since the guide lugs engage in the corresponding guide slots, the rotating sleeve and the rotating spindle are slidingly connected to each other. This means that when the rotating spindle turns for instance in the advance direction, the rotating sleeve remains stationary and the volute spring holds the rotating sleeve in place, preventing it from turning. Relative to the system enclosure the rotating sleeve is pivot-mounted in appropriate bearings.

To allow the use of standard rotary spindles or ball screws, the guide lugs can be positioned on a spindle head that is removably attached to one end of the rotating spindle. For example, the spindle head may be screwed onto the end of the rotating spindle and thus rigidly connected to it.

To permit in simple fashion a conversion of a rotation of the rotating spindle and of the spindle head into an axial movement of the actuator element, the spindle head can be equipped on the far side from the rotating spindle with a rotary mount accepting the end of the actuator element. By means of this rotary mount the actuator element and the rotating spindle can turn in relation to each other, except that in general the actuator element does not turn but is moved strictly in the axial forward or reverse direction.

In a simple design example the rotating sleeve and the casing may feature mutually facing end sections of an essentially identical outer diameter, onto which the volute spring is wound.

The volute spring itself is surrounded by the tensioning sleeve whose respective rotational position causes the volute spring to open or close.

As a simple way to seal off the system enclosure at least at the end from which the actuator element can be extended, the exit end of the enclosure can be equipped with an enclosure lid which is provided with a guide bore for the actuator element. The enclosure lid may be designed to screw either into or onto the system enclosure. In addition, the enclosure lid may be detachably fastened to the system enclosure by other suitable means such as screws or bolts.

To permit simplified suspension of the rotating-sleeve end on the enclosure lid, the system enclosure may be provided with at least one sleeve insert which protrudes into the enclosure and surrounds the rotating sleeve and in which the rotating sleeve is pivot-mounted.

A particularly compact design of the emergency release unit can be obtained by pivot-mounting the tensioning sleeve for instance on the outside of the casing and the sleeve insert.

By way of a suitable drive unit, possibly with a clutch mechanism, the tensioning sleeve can be connected to the electric motor for the rotating spindle or ball nut. For relatively independent and precise rotation of the tensioning sleeve it is possible to rotate the tensioning sleeve by means of an electric tensioning motor and in particular a step motor.

As a simple way to more or less tighten the volution of the rotating sleeve and casing in the corresponding areas as the tensioning sleeve turns, a cam may be provided especially on the inside of the tensioning sleeve in a way as to make contact with one coil end of the volute spring. The cam will open the coil end as a function of the rotation of the tensioning sleeve. By virtue of its intrinsic elastic force the volute spring will cause friction blockage against the opening direction.

For a particularly compact design of the actuator system the tensioning motor may be positioned within the enclosure next to the casing.

For as long as electric power is fed to the tensioning motor, it applies a holding force to the tensioning sleeve, counteracted by the pressure load of the tensioning sleeve in the relaxed position. If and when the electric power fails or drops off, the elastic force will turn the tensioning motor and especially the tensioning sleeve in the direction of the relaxed position. In a simple design example, the pressure load on the tensioning sleeve in the direction of the relaxed position can be provided by a return spring mounted between the tensioning sleeve and the enclosure or a component rigidly attached relative to the enclosure. As the tensioning sleeve turns, the relaxed return spring is tensioned, whereby the elastic energy in the return spring can be used to reset the tensioning sleeve in its relaxed position. It should be noted that the return spring is employed both for an emergency closure and for normal closing i.e. resetting of the tensioning sleeve as the volute spring is released.

In the simplest case the rigidly mounted component in question may be the enclosure lid and in particular the sleeve insert.

In order to also cock the return spring by means of the tensioning sleeve, an additional cam may be provided in a way as to protrude inward in an essentially radial sense from the inside of the tensioning sleeve and to make contact with a coil end of the torsional-type return spring. Specifically, the respective other end of the volute spring is locked in position on the rigidly mounted component.

To at least partially enclose the actuator element along the direction of the advance movement, the enclosure lid may be provided with an outer sleeve that is located opposite the sleeve insert and surrounds the actuator element.

To prevent water, dirt etc from penetrating into the outer sleeve, the free end of the latter can be equipped with a preferably detachable end cap that is provided with an exit opening for the essentially rod-shaped actuator element. The actuator element may have a polygonal or round cross section.

For an attenuation of the movement of the actuator element the outer sleeve may be at least partly filled with a fluid and at least one displacement element may protrude laterally from the actuator element within the outer sleeve.

One particularly effective yet simple displacement element may be a displacement disk radially extending outward from the actuator element and provided with at least one fluid-conducting aperture.

For facilitated maintenance and accessibility of the actuator system the enclosure may be composed of at least two detachably connected enclosure sections. In this context, for the purpose of replacing or easily repairing the motor-drive-unit, one of the enclosure sections may essentially constitute an enclosure and section housing the motor-drive assembly.

As an example of a simple approach to attaching the actuator system according to this invention to a corresponding control device, link-up hardware is provided directly on an outside surface of the enclosure in the area of the enclosure lid, allowing the attachment and detachment of a control device.

BRIEF DESCRIPTION OF THE DRAWINGS

The following describes in more detail advantageous design examples of this invention with the aid of the figures in the attached drawings in which.

DETAILED DESCRIPTION OF THE EMBODIMENTS

Figure 1:
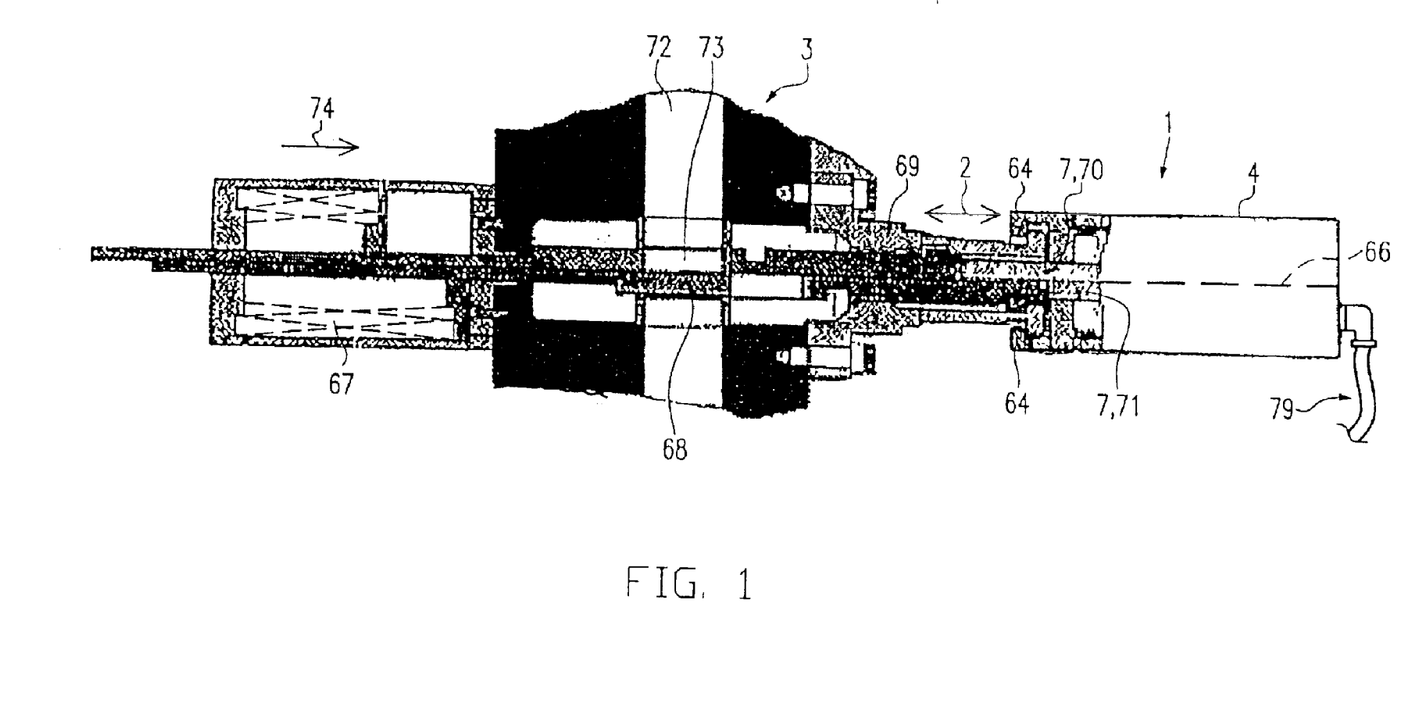
FIG. 1 is a longitudinal section through the actuator system according to this invention, attached to a control device.

The illustration in FIG. 1 depicts a section through an actuator system 1 according to this invention, laterally flanged to a control device 3 in the form of a gate valve. The actuator system 1 includes a system enclosure 4 in the axial direction 66 of which an actuator element 7 is slide-mounted to permit shifting between an extended position 70 and a retracted position 71. At the end of the actuator system 1 facing the control device 3 the actuator element 7 can be extended so as to shift a valve slide 68. At least one return spring 67 on the side of the control device 3 opposite the actuator system 1 is subjected to a pressure load in the reset direction 74.

The system enclosure 4 is detachably fastened to a flange housing 69 of the control device 3 by means of fasteners 64. Inside the flange housing 69 the actuator element 7 and the valve slide 68 can be moved in the shift direction 2. In the extended position 70 of the actuator element 7 the valve slide 68 is shifted within the control device 3 to a point where it exposes a valve gate 72 in the slide bore 73 of the valve slide 68. In its retracted position 71 the valve slide 68 closes the valve gate 72.

Connected at the end of the system enclosure 4 opposite the control device 3 is a cable 79 used for controlling the actuator system and for data transfer.

Figure 2:
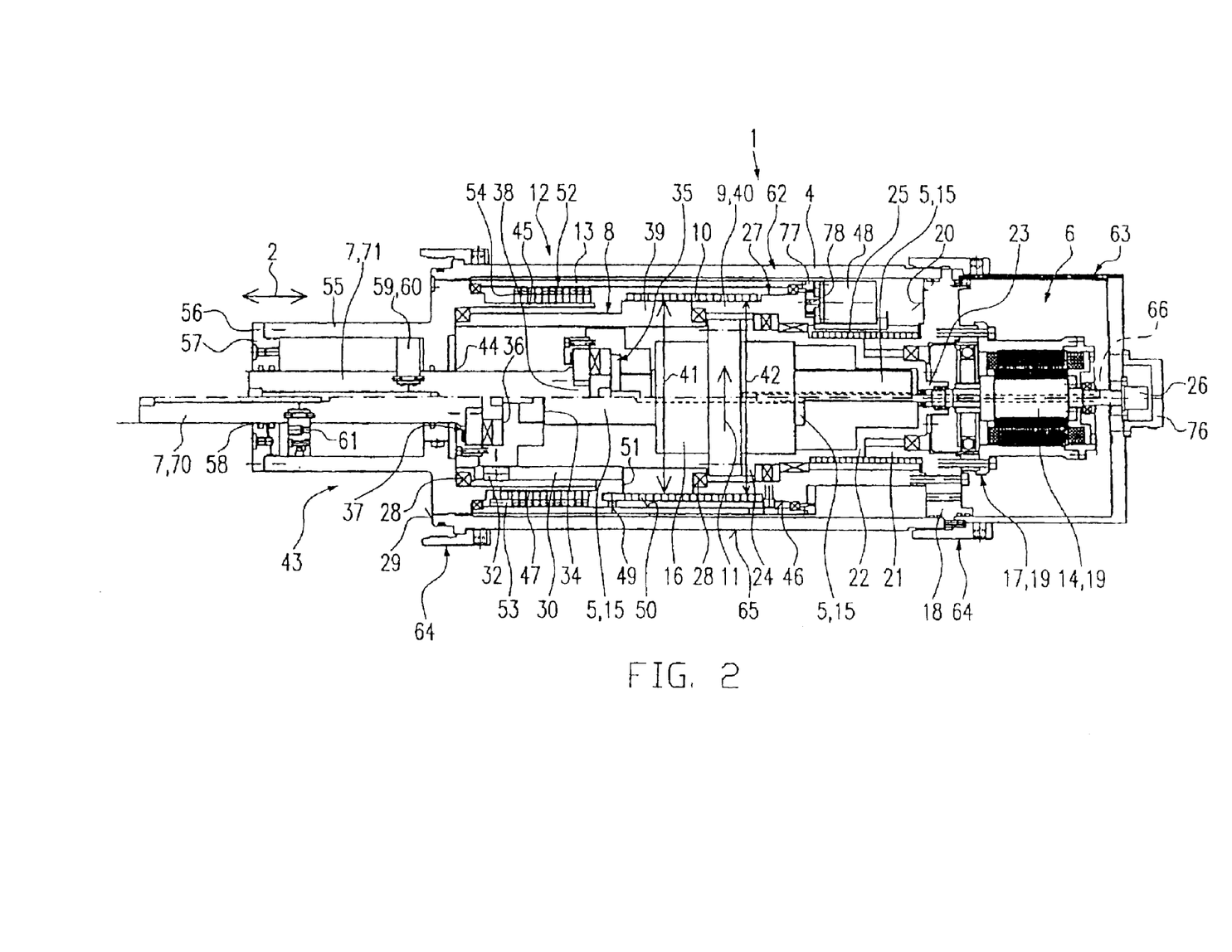
FIG. 2 shows a longitudinal section through the actuator system per FIG. 1 along the intersecting line II—II in FIG. 3.

FIG. 2 depicts a longitudinal section through the actuator system 1. In the upper half of FIG. 2 the actuator element 7 is shown in its retracted position 71, in the lower half separated by the axial line 66 the actuator element 7 is shown in its extended position 70 as in FIG. 1.

The two-part system enclosure 4 consists of enclosure sections 62 and 63. The enclosure section 63 constitutes an enclosure end part which is removably attached to the other enclosure section 62 by means of the fastening device 64. A corresponding fastening device 64 is located at the exit end 29 of the system enclosure 4 opposite the enclosure end section 63.

The enclosure section 63 houses an electric motor 14 constituting part of a motor-drive assembly 19. A positional sensor 26 at one end serves to detect the longitudinal position of the spindle 5. Opposite the exit end 29 of the system enclosure 4 the positional sensor 26 protrudes from the enclosure end section 63 and is positioned inside a sensor cap 76 that is detachably connected to the enclosure end section 63.

The electric motor 14 connects to a drive assembly 17 constituting its companion part of the motor-drive unit and consisting for instance of a so-called flex-spine drive without the traditional gears. The motor-drive unit 19 is attached to an annular disk 18 which extends horizontally across the inside of the system enclosure 4, while the drive assembly 17 is at least in part set in a corresponding central circular opening in the annular disk.

On the side 20 of the annular disk 18 facing away from the electric motor 14, the disk is provided with a ring extension 21 in which a connecting sleeve 22 is pivot-mounted. The end 23 of the connecting sleeve 22 is rotatably connected to the drive assembly 17 while at its opposite end 24 it is removably attached to a ball nut 16. The rotating spindle in the form of a ball screw 15 is suspended in the ball nut 16 in a way as to permit movement in the axial direction 66, i.e. in the shift direction 2. In the direction toward the ball screw 16 the connecting sleeve 22 features a series of sections with a progressively larger diameter, with its end 23 having the smallest diameter connected to the drive assembly 17. The combination of ball nut, rotating spindle 15 and motor-drive unit 19 constitutes an advance mechanism 6 for the actuator element 7.

Located in the connecting sleeve 22 is the rotating spindle 5, illustrated in the upper half of FIG. 2 in its fully retracted position in the connecting sleeve 22 while in the lower half it is shown in its maximum extended position from the connecting sleeve 22.

Situated between the connecting sleeve 22 and the ring extension 21 is a volute spring 26 as shown. It permits a rotation of the connecting sleeve 22 in the advance direction 11 while preventing any rotation in the reverse direction.

A rotary mount 28, indicated in the usual manner by a square or rectangle with diagonal lines, is located between the connecting sleeve 22 and the ring extension 21.

The connecting sleeve 22 is surrounded by a casing 27 one end of which is rigidly but detachably mounted on the annular disk 18. At its opposite end the casing 27 has an end section 40 constituting a circular flange 9 which surrounds the ball nut 16. In the direction of the exit end 29 of the system enclosure 4 the circular flange 9 connects to a rotating sleeve 8 whose end facing the circular flange 9 features an end section 39. The end section 39 and the circular flange 9 have the same outside diameter 41 and 42, respectively. A volute spring 10 is wound onto the end section 39 and the circular flange 9, respectively, rigidly connecting the casing 27 and the rotating sleeve 8 when the ball nut 16 turns in the advance direction 11. The rotating sleeve 8 extends all the way to the enclosure lid 43 mounted in the exit opening 29 of the system enclosure 4. On its inside, the enclosure lid is provided with a sleeve insert 45 which surrounds the rotating sleeve and in which the rotating sleeve is pivot-mounted on a rotary mount 28. By way of additional rotary bearings 28 at its other end, the rotating sleeve 8 is pivot-mounted on the circular flange 9 of the casing 27. The actuator element 7 extends through a guide bore 44 in the center of the enclosure lid 43. At its end 38 on the side of the rotating spindle 5, the actuator element 7 is connected to a rotary mount 37. At the end 34 of the rotating spindle 5 the rotary mount 37 is removably attached to and constitutes a separable part of a spindle head 35, supporting the rotating spindle on its side 36 opposite the spindle. Radially protruding from the rotary mount 37 are two mutually opposite guide lugs 32, 33 which engage in corresponding guide slots 30, 31 in the rotating sleeve 8 and are guided by these slots in an axial direction 66. By engaging in the guide slots, the guide lugs cause the rotary mount 37 and thus the rotating spindle 5 and the rotating sleeve 8 to be slidingly connected to one another.

On its outside opposite the sleeve insert 45, the enclosure lid 43 is provided with an outer sleeve 55 which surrounds the actuator element?. The free end 56 of the outer sleeve 55 is sealed off by an end cap 57. The actuator element 7 can be extended through an exit hole 58 in the end cap 57. In its retracted position 71 the free end of the actuator element 7 is essentially flush with the outside surface of the end cap 57. The outer sleeve 55 is filled with a fluid, not shown. The fluid serves to attenuate the movement of the actuator element 7 which is provided with a radially protruding displacement disk 60 acting as the displacement element 59. The displacement disk 60 is perforated with fluid-conducting apertures 61 which serve to attenuate the movement of the actuator element 7 especially in the direction of its extended position 70.

At one of its coil ends 51, the volute spring 10 makes contact with a cam 49 located on an inside surface 50 of a tensioning sleeve 13. The ends of the tensioning sleeve 13 are pivot-mounted in rotary mounts 28 on the outside 47 of the sleeve insert 45 and, respectively, on the outside 46 of the casing 27. At its end mounted on the casing 27, the tensioning sleeve 13 is provided with a radially inward-pointing terminal flange 77 with an internal gear rim. This toothed rim engages in a gear 78 that is turned by a tensioning motor 48. The tensioning motor 48 is positioned between the casing 27 and the system enclosure 4 and can be controlled independent of the electric motor 14 for turning the tensioning sleeve 13.

A return spring 52 in the form of a torsion spring is connected at one end to the sleeve insert 45. Its other coil end 54 makes contact with a cam 53 which protrudes from the inside 50 of the tensioning sleeve 13. When the tensioning motor 48 turns the tensioning sleeve 13, it tensions the return spring 52, producing the necessary return force for the tensioning sleeve 13.

The combination of tensioning motor 48, tensioning sleeve 13, volute spring 10 and return spring 52 constitutes an emergency release unit 12 which causes the actuator element 7 to be automatically reset into its retracted position 71 in the event of an electric-power failure in the actuator system 1.

Figure 3:
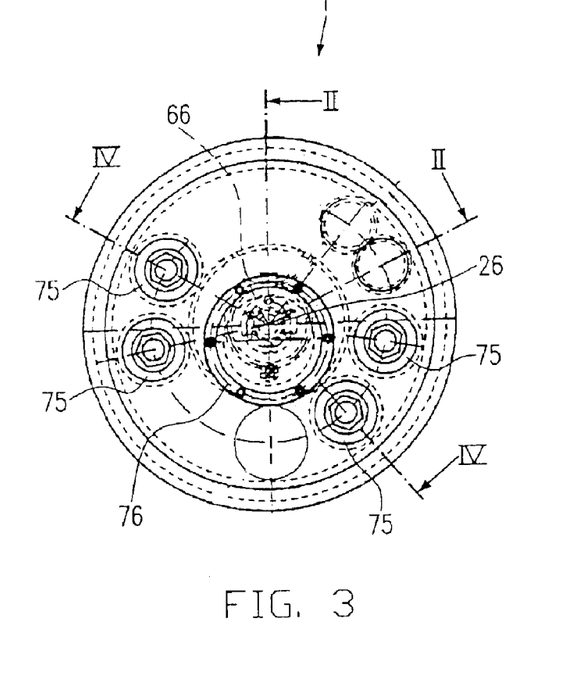
FIG. 3 is a front view of the actuator system per FIG. 2.
Figure 4:
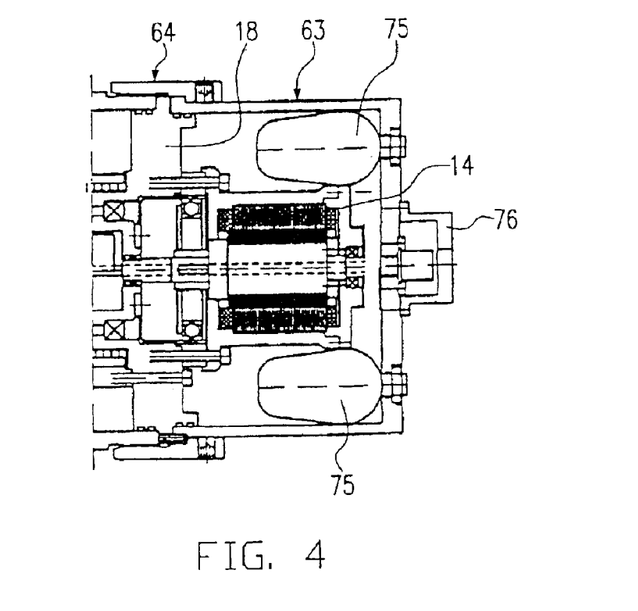
FIG. 4 is a sectional view along the line IV—IV in FIG. 3.

FIG. 3 is a frontal illustration of the actuator system 1 per FIG. 2 viewed in the direction of the enclosure end section 63 and the sensor cap 76. FIG. 2 represents a sectional view along the line II—II in FIG. 3. Four compensators 75, shown in more detail in FIG. 4, are mounted in a concentric arrangement around the positional sensor 26 per FIG. 3. FIG. 4 represents a section along the line IV—IV in FIG. 3.

The compensators 75 are positioned in the enclosure end section 63 in a radial configuration relative to the electric motor 14. These compensators serve to compensate for volume and pressure variations relative to a complete oil filling of the actuator system, i.e. they compensate for volume changes due to system actuation and to temperature fluctuations.

Figure 5:
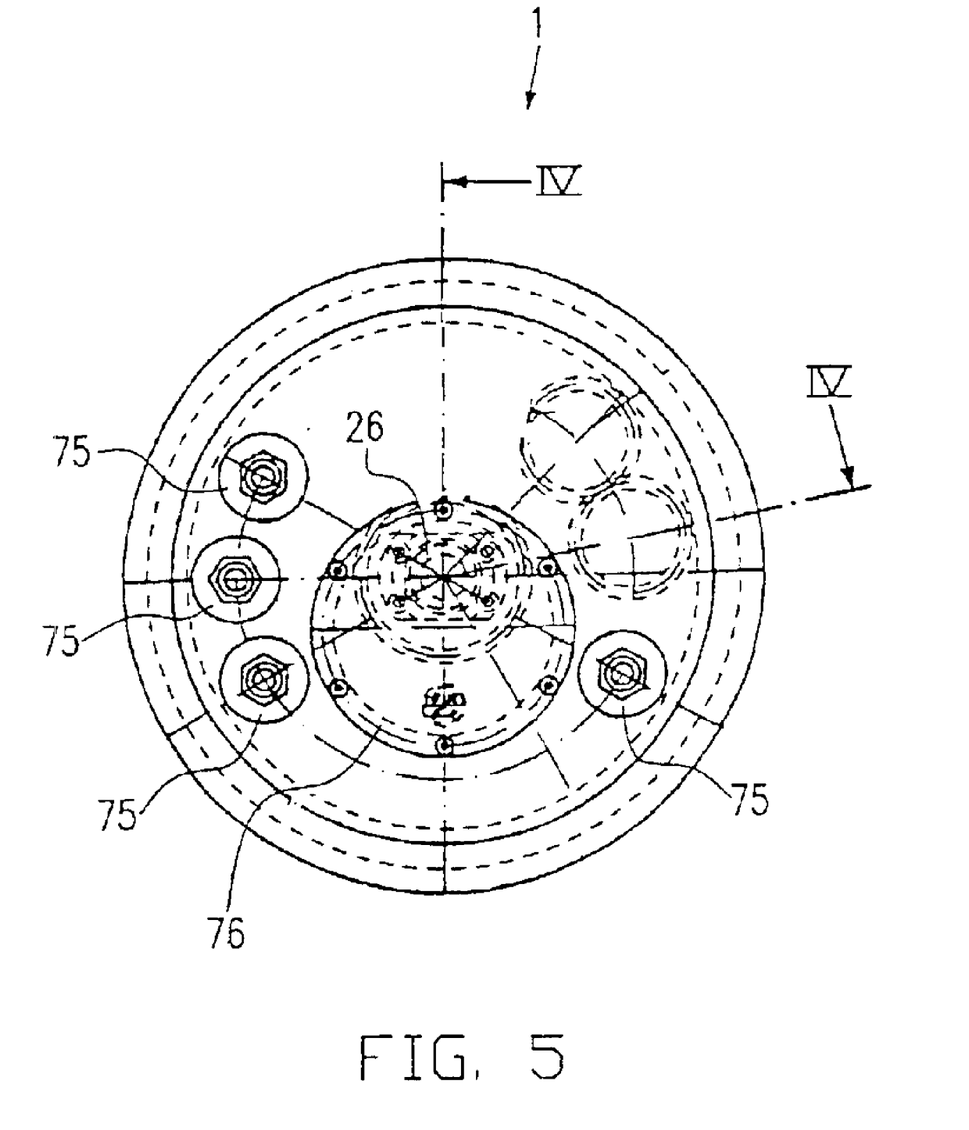
FIG. 5 is a front view, analogous to FIG. 3, of a second design example of an actuator system according to this invention.

FIG. 5 is an illustration, analogous to FIG. 3, of a second design example of an actuator system 1 according to this invention. Four compensators 75 are mounted in a concentric arrangement relative to the positional sensor 26.

Figure 6:
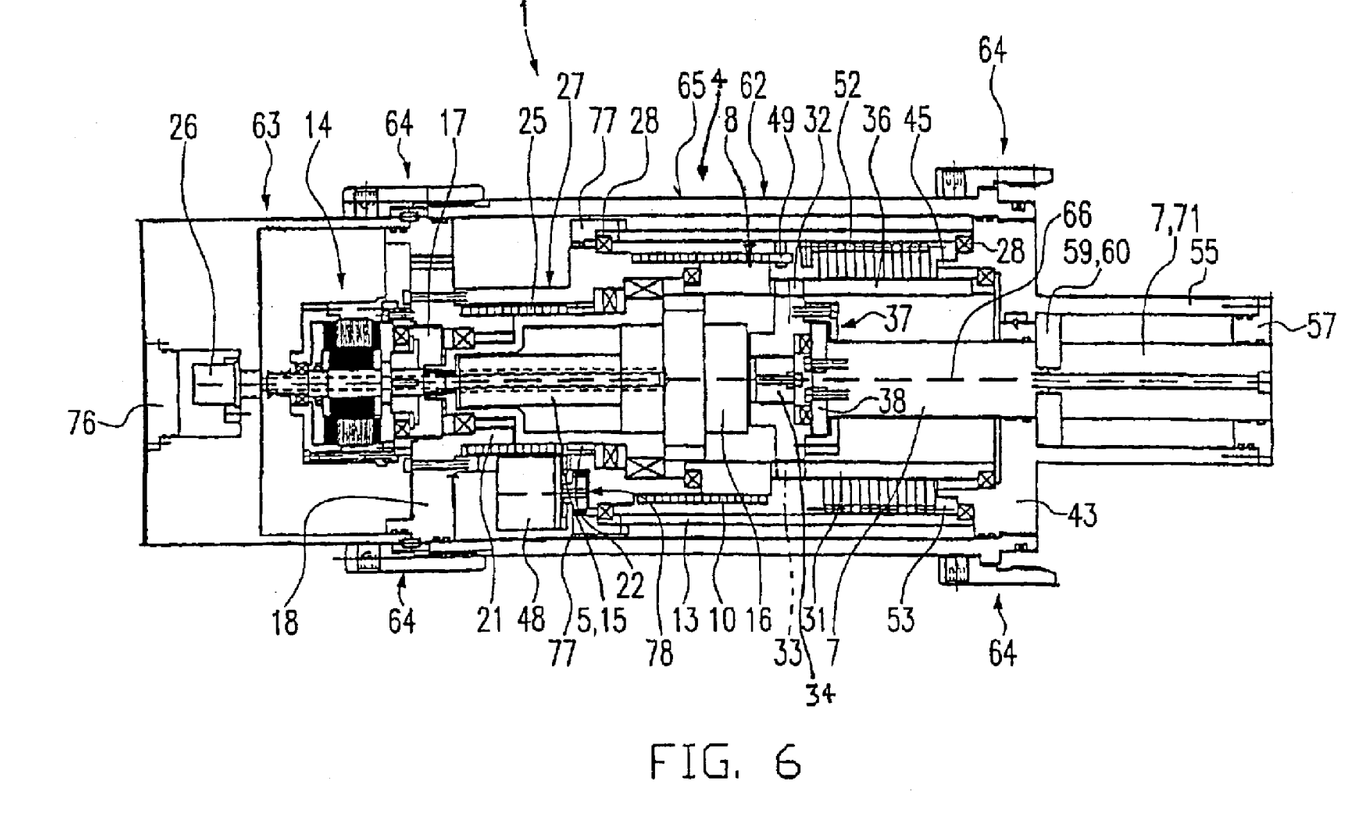
FIG. 6 is a sectional view along the line VI—VI in FIG. 5.

FIG. 6 represents a sectional view along the line VI—VI in FIG. 5. For a description of the second design example of the actuator system 1, reference is made to FIG. 2, with identical components bearing identical reference numbers which latter will be mentioned only as required.

The second design example of the actuator system 1 essentially differs from the first in that the sleeve insert 45 protrudes less deeply into the system enclosure 4. As another difference, the positional sensor 26 is recessed into the enclosure end section 63 and the opening accommodating the positional sensor can be sealed relative to the outside of the enclosure end section 63 by a flush-mounted sensor cap 76.

Furthermore, the electric motor 14 is of smaller dimensions since the second design version of the actuator system 1 according to this invention is intended for less demanding performance requirements.

FIG. 6 shows the actuator element 7 in its retracted position 71 whereby, as can also be seen in FIG. 2, its end is flush with the outside surface of the end cap 57.

By way of example and similar to FIG. 2, the system enclosure 4 is provided on its outside 65 with suitable fastening devices 64 which serve to connect the enclosure end section 63 with the enclosure section 62 and the enclosure section 62 for instance with the flange housing 69 per FIG. 1.

With the aid of the attached figures, the following will briefly explain the mode of operation of the actuator system 1 according to this invention.

The actuator element 7 is moved into the shift position 2 by operating the electric motor 14 which, by way of the drive assembly 17, turns the connecting sleeve 22 and, rigidly connected to the latter, the ball nut 16. As the ball nut turns, the rotating spindle 5 or ball screw 15 is moved in an axial direction in the process of which, by way of the rotary mount 37 at its end 34, it moves the actuator element 7 in the direction of the extended position 70.

At the same time, or before that, the tensioning motor 48 turns the gear 78 and with it the tensioning sleeve 13. The cams 49 and 53 respectively cause the volute spring 10 to be relaxed and the return spring 52 to be tensioned. Specifically, the volute spring 10, by virtue of its intrinsic coiling strength, wraps around the rotating sleeve 8 and the casing 27, thus rigidly connecting these components. The return spring 52 is tensioned by the rotation of the tensioning sleeve 13.

The connection between the rotating sleeve 8 and the casing 27 prevents the ball screw 5 from turning backward. The corresponding return-pressure energy is transferred to the system enclosure 4 via the casing 27.

If and when the tensioning motor 48, designed as a step motor, is fed a corresponding holding current, it will hold its position, as will the tensioning sleeve 13. The return spring 52 stores energy which tries to turn the tensioning sleeve 13 back against the holding force of the tensioning motor 48.

In the extended position 70 of the actuator element 7 the valve gate 72 per FIG. 1 is open, allowing gas, oil or similar exploration or extraction to take place.

The corresponding longitudinal movement of the rotating spindle 5 is monitored by the positioned sensor 26.

If the valve gate 72 is to be closed, the holding force of the tensioning motor 48 is brought down by appropriate controls. This will then release the volute spring 10, enabling the rotating sleeve 8, powered by the return energy of the return spring 52, to rotate in the opposite direction relative to the casing 27. By virtue of the sliding connection between the rotating sleeve 8 and the rotating spindle 5, provided by the guide slots 30, 31 and guide lugs 32, 33, the rotating spindle and ball nut 16 can reverse direction toward the electric motor 14, whereby the actuator element 7, connected to the rotating spindle, is shifted back into its retracted position 71. A major factor in this context is the return force applied by the return spring 67 per FIG. 1 on the actuator element 7 since it is essentially this force that resets both the actuator element 7 and the rotating spindle 5. The return spring 52 essentially serves only the purpose of turning back the tensioning sleeve 13 and correspondingly releasing the volute spring 10.

In the event of a power failure as well, the holding force in the tensioning motor 48 subsides, causing an emergency closure of the actuator system 1 due to the action of the emergency release unit 12 composed of the return spring 52, volute spring 10 and tensioning sleeve 13. As described further above, the return spring 52 turns the tensioning sleeve 13 back, releasing the volute spring 10, so that the rotating sleeve 8 can then rotate relative to the casing 27. The remainder of the closing process takes place in the same way as in a normal closing operation of the actuator system 1.

It is thus possible to operate and close a corresponding valve without an extraneous control and electric power-supply system.

The actuator system 1 described above is particularly suitable for use in the oil, gas, refinery or chemical industry where remote-controlled actuation of a pressure-regulating or shut-off valve or the like in remote and/or dangerous locales is desirable. The emergency release unit 12 according to this invention can be employed not only in conjunction with the aforementioned flex spline drive without traditional gears but also with other, conventional drive systems, production motors and standard clutch/brake combinations.

What is claimed is:

1. An actuator system for shifting a control device that is pressure-loaded in the direction opposite the shift direction, said actuator system comprising:
   an actuator element capable of being axially moved in the shift direction within a system enclosure by a rotating spindle of an advance mechanism;
   the rotating spindle being slidingly connected to and rotating with a rotating sleeve that is pivot-mounted in the system enclosure and surrounds the rotating spindle, the rotating sleeve, relative to a circular flange rigidly connected to the system enclosure, being locked in position in the direction opposite the direction of advance rotation of the rotating spindle by means of a volute spring;
   the volute spring being associated with an emergency release unit for resetting the actuator element against the shift direction;
   the emergency release unit being provided with a tensioning sleeve for the volute spring;
   the tensioning sleeve being rotatable between a tensioned and a relaxed position and being pressure-loaded in the direction of its relaxed position, said volute spring being releasably retained in the tensioning sleeve's tensioned position.

2. The actuator system as in claim 1, wherein the advance mechanism includes an electric motor for turning the rotating spindle.

3. The actuator system as in claim 2, wherein a positional sensor is provided in the advance mechanism and specifically connected to the electric motor with the spindle.

4. The actuator system as in claim 2, wherein the rotating sleeve extends essentially from the ball nut to an exit end of the system enclosure opposite the electric motor, the said rotating sleeve featuring at least two guide slots in which matching guide lugs, protruding radially relative to the rotating spindle, can be moved in an axial direction.

5. The actuator system as in claim 4, wherein the guide lugs are mounted on a spindle head that is removably attached to one end of the rotating spindle.

6. The actuator system as in claim 5, wherein the spindle head is provided on its side facing away from the rotating spindle with a rotary mount for supporting one end of the actuator element.

7. The actuator system as in claim 1, wherein the rotating spindle is in the form of a revolving-ball screw and the electric motor drives a ball nut which supports the rotating spindle.

8. The actuator system as in claim 1, wherein a drive assembly is interpositioned between the electric motor and the ball nut.

9. The actuator system as in claim 8, wherein the electric motor and the drive assembly constitute a motor drive unit attached, particularly in removable fashion, to an annular disk horizontally mounted in the system enclosure.

10. The actuator system as in claim 9, wherein the annular disk is provided on its side facing the ball nut with a ring extension in which a connecting sleeve is pivot-mounted, one end of which latter is detachably connected to the motor-drive unit while its other end is removably attached to the ball nut.

11. The actuator system as in claim 10, wherein a casing surrounds the ring extension and the connecting sleeve and is removably attached to the annular disk.

12. The actuator system as in claim 11, wherein the rotating sleeve is rotatable relative to the casing and that the volute spring is positioned between these two components.

13. The actuator system as in claim 11, wherein the rotating sleeve and the casing feature manually facing end sections having an essentially identical outer diameter and supporting the volute spring.

14. The actuator system as in claim 10, wherein an additional volute spring is located between the connecting sleeve and the ring extension.

15. The actuator system as in claim 1 wherein an enclosure lid with a guide bore for the actuator element is located at the exit end of the system enclosure.

16. The actuator system as in claim 15, wherein the enclosure lid is provided with at least one sleeve insert protruding into the system enclosure and surrounding the rotating sleeve while pivot-supporting the rotating sleeve.

17. The actuator system as in claim 16, wherein a return spring bearing on the tensioning sleeve in the direction of the relaxed position is situated between the tensioning sleeve and the system enclosure or a component rigidly attached relative to the system enclosure.

18. The actuator system as in claim 17 wherein said rigidly mounted component comprises the sleeve insert.

19. The actuator system as in claim 17, wherein a cam protrudes inward in essentially radial fashion from the inside of the tensioning sleeve, said cam making contact with a coil end of the return spring.

20. The actuator system as in claim 16, wherein the enclosure lid incorporates, opposite the sleeve insert, an outer sleeve which surrounds the actuator element.

21. The actuator system as in claim 20, wherein the outer sleeve is provided at its free end with a detachable end cap featuring an exit hole for the essentially rod-shaped actuator element.

22. The actuator system as in claim 20, wherein the outer sleeve is at least partly filled with a fluid, and at least one displacement element protrudes within the outer sleeve from the actuator element.

23. The actuator system as in claim 22, wherein the displacement element is in the form of a displacement disk protruding radially from the actuator element and having at least one fluid-conducting aperture.

24. The actuator system as in claim 16 wherein the tensioning sleeve is rotatably supported on the outside surfaces of the casing and the sleeve insert.

25. The actuator system as in claim 15, wherein a fastening device is provided on an outside surface of the system enclosure in the area of the enclosure lid for removably attaching the control device.

26. The actuator system as in claim 1 wherein the tensioning sleeve can be rotated by an electric tensioning motor comprising a step motor.

27. The actuator system as in claim 26 wherein a cam is provided on the inside of the tensioning sleeve, making contact with one coil end of the volute spring.

28. The actuator system as in claim 26, wherein the tensioning motor is housed in the system enclosure beside the casing.

29. The actuator system as in claim 1, wherein the system enclosure is composed of at least two detachably connected enclosure sections.

30. The actuator system as in claim 29, wherein one enclosure section essentially constitutes the enclosure end cover housing the motor-drive unit.

31. An apparatus for resetting an actuator, the actuator having an enclosure and an advance mechanism for shifting axially an actuator element that is pressure-loaded in a direction opposite the shift direction, the actuator element being attached to the advance mechanism, the apparatus comprising:

a rotating sleeve pivot-mounted in the enclosure and slidingly connected to and rotating with the actuator element;

a volute spring locking said rotating sleeve in position in the direction opposite the direction of advance rotation of the rotating spindle;

said volute spring being associated with an emergency release unit for resetting the actuator element against the shift direction;

said emergency release unit being provided with a tensioning sleeve for said volute spring; and said tensioning sleeve being rotatable between a tensioned and a released position and being pressure-loaded in the direction of said relaxed position, said volute spring being releasably retained in said tensioned position.

32. An apparatus for resetting an actuator, the actuator having an enclosure and an advance mechanism for shifting axially an actuator element that is pressure-loaded in a direction opposite the shift direction, the actuator element being attached to the advance mechanism, the apparatus comprising:

a sleeve rotatably mounted within the enclosure and being slidingly connected to the actuator element such that said sleeve does not rotate relative to the actuator element;

a first spring having a first end fixed to the enclosure and a second end, said first spring having a first position allowing said sleeve to rotate with respect to the enclosure and allowing the actuator element to rotate, and a second position preventing said sleeve from rotating with respect to the enclosure and preventing the actuator element from rotating;

a release unit having a tensioning sleeve engaging said second end of said first spring;

a second spring having a first end fixed to the enclosure and a second end engaging said tensioning sleeve;

a motor selectively rotating said tensioning sleeve in a first direction causing said second spring to tension and said first spring to move into said second position preventing rotation of said sleeve and the actuator element and in a second direction causing said second spring to untension and said first spring to move into said first position allowing rotation of said sleeve and actuator member;

said motor holding said tensioning sleeve in position and said second spring in tension while said motor has power;

said motor releasing said tensioning sleeve if said motor loses power thus allowing said second spring to untension and rotate said tensioning sleeve in said second direction to move said first spring into said first position allowing said sleeve and the actuator element to rotate; and the rotation of the actuator element allowing the pressure-loading in the direction opposite the shift direction to reset the actuator element.

* * * * *